（12）United States Patent
Haramburu et al.

(10) Patent No.: US 10,641,209 B2
(45) Date of Patent: May 5, 2020

(54) JET ENGINE NACELLE HAVING A REVERSER FLAP

(71) Applicants: Airbus Operations SAS, Toulouse (FR); Airbus SAS, Blagnac (FR)

(72) Inventors: Eric Haramburu, Colomiers (FR); Patrick Oberle, Verdun sur Garonne (FR); Nicolas Jolivet, Fontenilles (FR)

(73) Assignees: AIRBUS OPERATIONS SAS, Toulouse (FR); AIRBUS SAS, Blagnac (FR)

(*) Notice: Subject to any disclaimer, the term of this patent is extended or adjusted under 35 U.S.C. 154(b) by 363 days.

(21) Appl. No.: 15/883,260

(22) Filed: Jan. 30, 2018

(65) Prior Publication Data
US 2018/0216574 A1 Aug. 2, 2018

(30) Foreign Application Priority Data

Jan. 31, 2017 (FR) ...................... 17 50798

(51) Int. Cl.
*F02K 1/76* (2006.01)
*F02K 1/70* (2006.01)
*B64D 29/06* (2006.01)
*F02K 1/72* (2006.01)

(52) U.S. Cl.
CPC .............. *F02K 1/763* (2013.01); *B64D 29/06* (2013.01); *F02K 1/70* (2013.01); *F02K 1/72* (2013.01)

(58) Field of Classification Search
CPC .............. F02K 1/763; F02K 1/70; F02K 1/72
See application file for complete search history.

(56) References Cited

U.S. PATENT DOCUMENTS

| 3,497,165 | A | * | 2/1970 | Bee | ........................... F02K 1/72 244/53 R |
|---|---|---|---|---|---|
| 4,410,152 | A | | 10/1983 | Kennedy et al. | |
| 4,716,724 | A | * | 1/1988 | Newton | .................... F02K 1/72 239/265.29 |
| 8,876,018 | B2 | * | 11/2014 | Vauchel | ................ B64D 29/06 239/265.19 |
| 10,006,405 | B2 | * | 6/2018 | Stuart | ....................... F02K 1/72 |

(Continued)

FOREIGN PATENT DOCUMENTS

| FR | 2486153 | 1/1982 |
|---|---|---|
| FR | 3010144 | 3/2015 |

OTHER PUBLICATIONS

French Search Report, dated Sep. 19, 2017, priority document.

*Primary Examiner* — Brian M O'Hara
(74) *Attorney, Agent, or Firm* — Greer, Burns & Crain, Ltd.

(57) ABSTRACT

A nacelle comprising a fixed cowl and a movable cowl movable in translation, a window delimited by the fixed cowl and the movable cowl, a reverser flap movable in rotation and a drive mechanism coordinating the movements of the reverser flap with those of the movable cowl. The drive mechanism comprises two bearings fixed to the nacelle, for each bearing, a lever arm with one end movable in rotation on the bearing and one end articulated on the reverser flap, for each lever arm, a rail comprising a straight portion and a curved portion, for each lever arm, a rod with one end articulated on the lever arm, and for each rail, a slider that is movable in translation on the rail and is articulated to one end of the rod.

6 Claims, 2 Drawing Sheets

(56) References Cited

U.S. PATENT DOCUMENTS

| | | |
|---|---|---|
| 10,344,709 B2* | 7/2019 | Smith ........................ F02K 1/09 |
| 2010/0006697 A1* | 1/2010 | Horinouchi ............. B64C 15/02 |
| | | 244/1 N |
| 2014/0239083 A1 | 8/2014 | Suciu et al. |
| 2020/0003154 A1* | 1/2020 | Carr ........................ F02K 1/763 |

* cited by examiner

US 10,641,209 B2

JET ENGINE NACELLE HAVING A REVERSER FLAP

CROSS-REFERENCES TO RELATED APPLICATIONS

This application claims the benefit of the French patent application No. 1750798 filed on Jan. 31, 2017, the entire disclosures of which are incorporated herein by way of reference.

TECHNICAL FIELD

The present invention relates to a nacelle for a turbofan that comprises at least one reverser flap, to a turbofan comprising a nacelle of that kind and an engine, and to an aircraft comprising at least one such turbofan.

BACKGROUND OF THE INVENTION

An aircraft includes a fuselage, to each side of which is fixed a wing. Under each wing is suspended at least one turbofan. Each turbofan is fixed under the wing by means of a pylon that is fixed between the structure of the wing and the structure of the turbofan.

The turbofan comprises an engine and a nacelle that is fixed around the engine.

The nacelle comprises at least one reverser flap that is movable between a closed position in which it becomes continuous with the exterior surface of the nacelle and an open position in which it opens a window in the wall of the nacelle to expel the air of the bypass flow to the outside.

The reverser flap is mounted movable in rotation on the structure of the nacelle so as to pass from a closed position in which the reverser flap does not obstruct the bypass flow duct to an open position in which the reverser flap obstructs the duct.

Accordingly, in the open position, the reverser flap deflects a part of the bypass flow to the outside via the window.

Although the mechanism of a reverser flap of this kind is entirely satisfactory, it is desirable to find different mechanisms.

SUMMARY OF THE INVENTION

The present invention has an object of proposing a nacelle comprising at least one reverser flap with a different opening mechanism.

To that end, there is proposed a nacelle for a turbofan, the nacelle comprising:
 a fixed cowl and a movable cowl, movable in translation in a translation direction between a closing position in which it is close to the fixed cowl and an opening position in which it is far aft of the fixed cowl,
 an actuator configured to move the movable cowl from the closing position to the opening position, and vice versa,
 a window delimited on the upstream side by the fixed cowl and on the downstream side by the movable cowl, the window being open between a duct for a bypass flow and the exterior of the nacelle,
 a reverser flap mounted movable in rotation about a rotation axis between a closed position in which it obstructs the window and an open position in which it does not obstruct the window, and a drive mechanism designed to coordinate the movement from the closed position to the open position of the reverser flap with the movement from the closing position to the opening position of the movable cowl and vice versa, the drive mechanism comprising:
 two bearings, each being mounted fixedly on a structure of the nacelle,
 for each bearing, a lever arm, of which a first end is mounted movable in rotation on the bearing and of which a second end is mounted fixedly on the reverser flap,
 for each lever arm, a rail integral with the movable cowl, each rail comprising a straight portion, of which the axis is parallel to the direction of translation of the movable cowl, and a curved portion that extends the straight portion towards the front,
 for each lever arm, a rod, of which a first end is mounted in an articulated manner on the lever arm, and
 for each rail, a slider that is mounted so as to be movable in translation on the rail and is mounted so as to be articulated to a second end of the rod.

Advantageously, the nacelle further comprises an additional flap mounted movable in rotation between a retracted position in which it is not positioned in the duct and an active position in which it is positioned across the duct and extends the reverser flap in the open position in the duct, and it comprises additional means that coordinate the movement of the additional flap from the retracted position to the active position with the movement of the reverser flap from the closed position to the open position and vice versa.

The invention also proposes a turbofan comprising an engine and any of the above variants of a nacelle surrounding the engine and in which a duct for a bypass flow is delimited between the nacelle and the engine.

The invention also proposes an aircraft comprising at least one turbofan in accordance with the above variant.

BRIEF DESCRIPTION OF THE DRAWINGS

The features of the invention mentioned above, along with others, will become more clearly apparent on reading the following description of one exemplary embodiment, the description being given with reference to the appended drawings, in which.

DETAILED DESCRIPTION OF THE PREFERRED EMBODIMENTS

Figure 1:
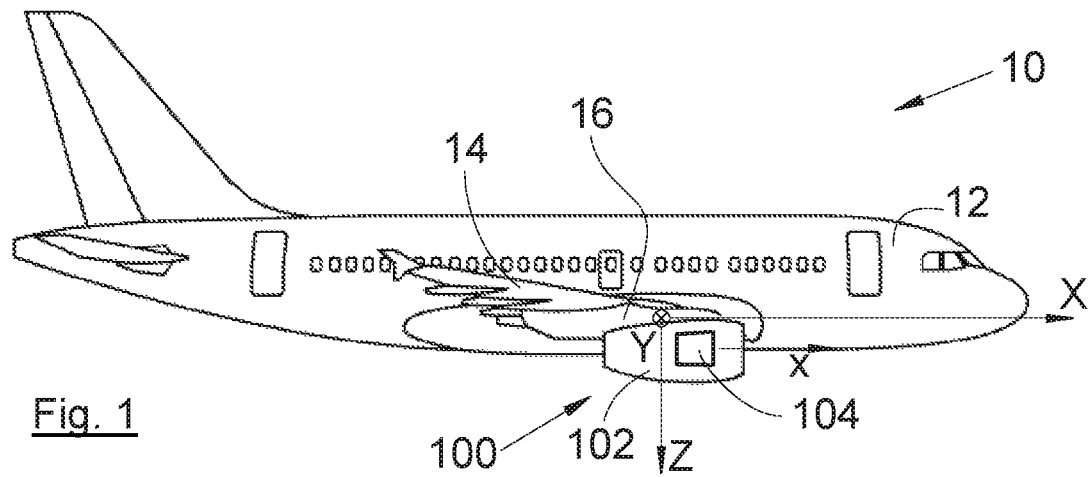
FIG. 1 is a side view of an aircraft comprising a nacelle according to the invention.

In the following description, terms relating to a position are provided in relation to an aircraft in a forward movement position as shown in FIG. 1.

FIG. 1 shows an aircraft 10 that comprises a fuselage 12, to each side of which is fixed a wing 14 that bears at least one turbofan 100 according to the invention. The turbofan 100 is fixed under the wing 14 by means of a pylon 16.

Figure 2:
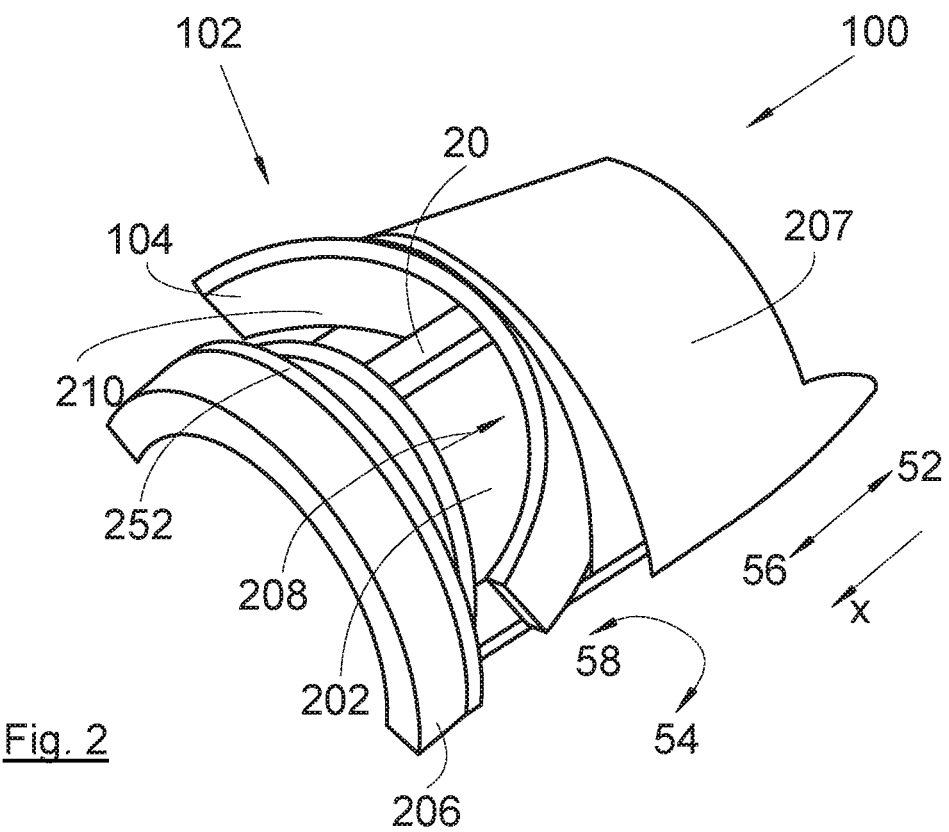
FIG. 2 is a perspective view of the nacelle according to the invention in an open position.
Figure 3:
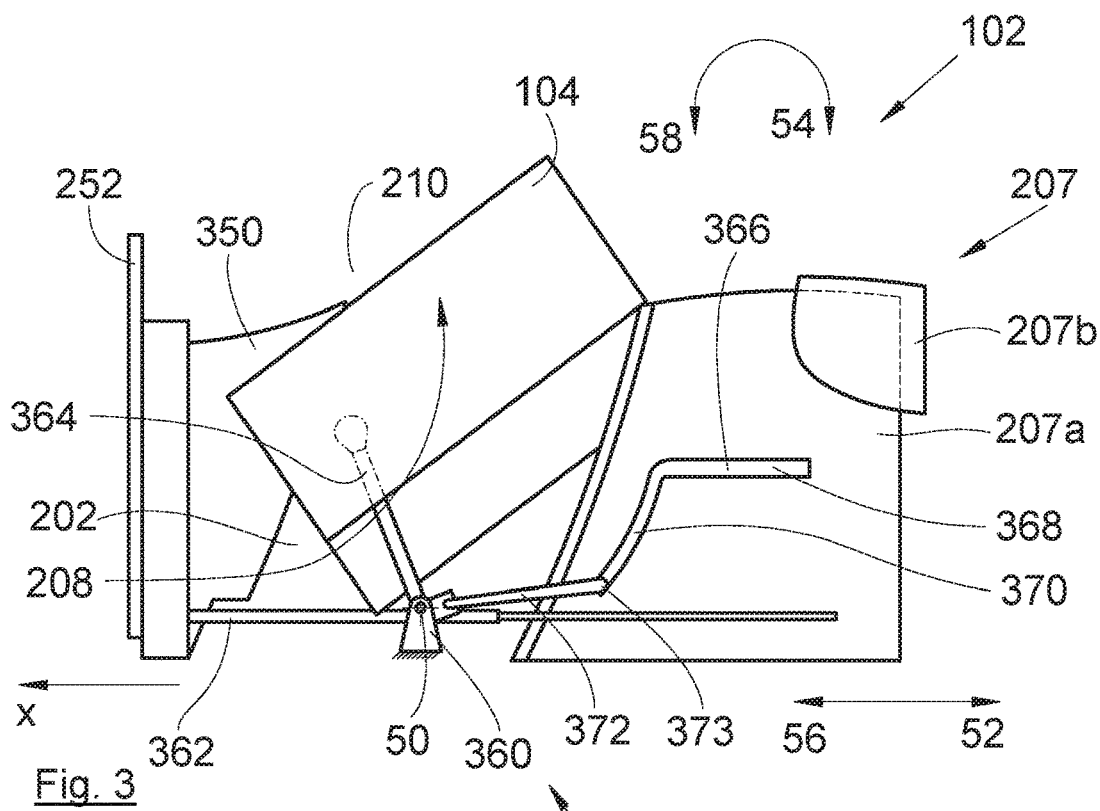
FIG. 3 is a side view according to the invention in the open position with its drive mechanism.
Figure 4:
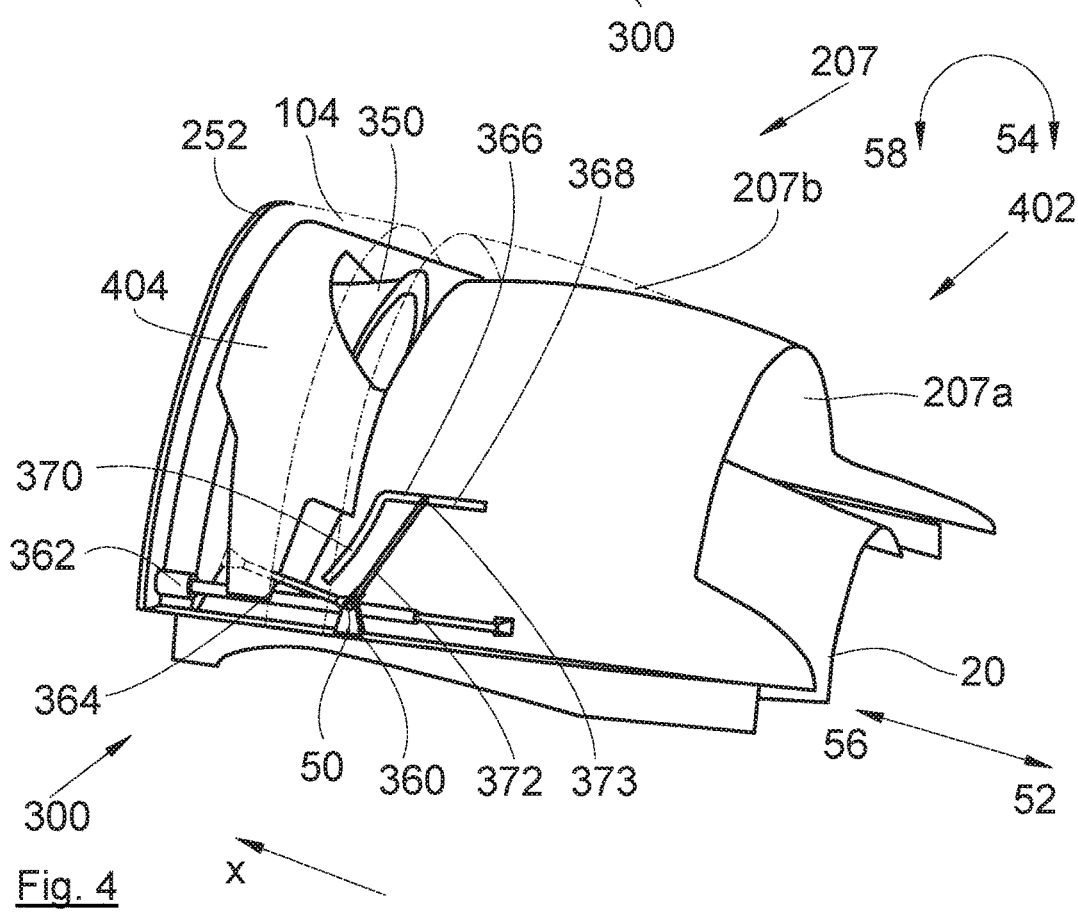
FIG. 4 is a perspective view of the nacelle according to the invention in an intermediate position with its drive mechanism.

FIGS. 2 and 3 show a nacelle 102 according to a first embodiment of the invention and FIG. 4 shows a nacelle 402 according to a second embodiment of the invention.

The turbofan 100 comprises a nacelle 102, 402 and an engine 20 that is housed inside the nacelle 102, 402, and a duct 202 between the nacelle 102, 402 and the engine 20, in which flows the bypass flow 208.

In the following description, and by convention, x denotes the longitudinal axis of the nacelle 102, 402 that is parallel to the longitudinal or roll axis X of the aircraft 10 oriented positively in the direction of forward movement of the aircraft 10, Y denotes the transverse axis or pitch axis of the aircraft which is horizontal when the aircraft is on the ground, and Z denotes the vertical axis or vertical height or yaw axis when the aircraft is on the ground, these three directions X, Y and Z being mutually orthogonal and forming an orthonormal frame of reference the origin of which is the center of gravity of the aircraft.

The nacelle 102, 402 comprises at least one reverser flap 104. In particular, there can be two reverser flaps 104 arranged opposite one another, or four reverser flaps 104 regularly distributed over the periphery of the nacelle 102, 402.

In the following description, the invention is more particularly described for one reverser flap 104, but the description applies in the same manner to each reverser flap 104 when there is more than one of these.

For each reverser flap 104 the nacelle 102, 402 comprises a window 210 that is open between the duct 202 and the exterior of the nacelle 102, 402.

The nacelle 102, 402 features a fixed cowl 206 that delimits the window 210 on the upstream side relative to the longitudinal axis x and that is fixedly mounted on a structure of the nacelle 102, 402.

The nacelle 102, 402 has a movable cowl 207 that delimits the window 210 on the downstream side relative to the longitudinal axis x. The movable cowl 207 is mounted movable in translation in a translation direction globally parallel to the longitudinal axis x on the structure of the nacelle 102, 402. Translation is effected by any appropriate means such as rails between the structure of the nacelle 102, 402 and the movable cowl 207.

The fixed cowl 206 and the movable cowl 207 have an exterior surface that constitutes the exterior envelope of the nacelle 102, 402 and an interior surface that constitutes an exterior wall of the duct 202.

The movable cowl 207 is movable between a closing position in which it is close to the fixed cowl 206 and an opening position in which it is far aft of the fixed cowl 206 so as to enlarge the window 210.

The reverser flap 104 is mounted movable in rotation about a rotation axis 50 on the structure of the nacelle 102, 402 between a closed position in which it obstructs the window 210 and an open position in which it does not obstruct the window 210. Here, in the embodiment of the invention shown in FIGS. 2 to 4, the rotation axis 50 is perpendicular to the longitudinal axis x.

In the closed position, the reverser flap 104 is positioned between the fixed cowl 206 and the movable cowl 207, which is in the closing position, and the reverser flap 104 extends the movable cowl 207, and the fixed cowl 206 extends the reverser flap 104. In the open position, the movable cowl 207 is moved aft to facilitate the maneuvering of the reverser flap 104 from the closed position to the open position.

When the reverser flap 104 is in the closed position, the exterior surface of the reverser flap 104 extends between the exterior surface of the fixed cowl 206 and the exterior surface of the movable cowl 207 and its interior surface extends between the interior surface of the fixed cowl 206 and the interior surface of the movable cowl 207.

When the reverser flap 104 is in the open position, the reverser flap 104 crosses the duct 202 and deflects at least part of the bypass flow 208 to the outside through the window 210.

The movement of the reverser flap 104 from the closed position to the open position is coordinated but offset with the movement of the movable cowl 207 from the closing position to the opening position and vice versa.

This coordination is brought about by a drive mechanism 300 which is shown in FIGS. 3 and 4 and which, starting from the closed position and the closing position, effects a first combination that brings about:
- an aft translation (arrow 52) of the movable cowl 207 in a translation direction globally parallel to the longitudinal axis x that moves the movable cowl 207 from the closing position to the opening position, then
- a rotation (arrow 54) of the reverser flap 104 about the rotation axis 50 that moves the reverser flap 104 from the closed position to the open position.

Conversely, the movement of the reverser flap 104 from the open position to the closed position is brought about by the same drive mechanism 300 that is also designed to effect a second combination that brings about, from the open position and the opening position:
- a rotation in the reverse direction (arrow 58) of the reverser flap 104 about the rotation axis 50 that returns the reverser flap 104 from the open position to the closed position, then
- a forward translation (arrow 56) of the movable cowl 207 in the translation direction that moves the movable cowl 207 from the opening position to the closing position.

In the embodiment of FIG. 4, the reverser flap 104 has a length along the longitudinal axis x that is reduced relative to that of the previous embodiment.

To fill the gap between the reverser flap 104 and the engine 20, the nacelle 600 has an additional flap 404 which, in the open/opening position, extends between the reverser flap 104 and the engine 20 in order to obstruct the duct 202. The provision of an additional flap 404 of this kind also makes it possible to improve the forward deflection of the bypass flow 208.

The additional flap 404 is movable in rotation between a retracted position in which it is not positioned in the duct 202 and an active position in which it is positioned across the duct 202 to deflect the bypass flow 208. The movement from the retracted position to the active position is effected in a manner coordinated with the movement from the closed position to the open position of the reverser flap 104, and vice versa. In the active position, the additional flap 404 therefore extends the reverser flap 104 in the open position in the duct 202 as far as the engine 20 to deflect the bypass flow 208.

In the embodiments of the invention shown in FIGS. 3 and 4, the movable cowl 207 features an interior wall 207a and an exterior wall 207b (shown in partial section in FIG. 3 and in cutaway in FIG. 4) that are moved in the same manner and simultaneously. The exterior wall 207b is the wall that comes into alignment with the reverser flap 104 in the closing position and constitutes an exterior wall of the nacelle 102, 402 and the interior wall 207a defines the peripheral surface of the duct 202 around the engine 20.

In the opening/open position, the reverser flap 104 and the additional flap 404 in the active position are positioned upstream of the interior wall 207a and of the exterior wall 207b and across the duct 202.

The nacelle 102, 402 also features an upstream wall 350 that extends upstream of the interior wall 207a relative to the longitudinal axis x and constitutes an exterior wall of the duct 202 around the engine 20. The upstream wall 350 is fixed relative to the structure of the nacelle 102, 402 and is situated substantially at the level of the front frame 252. In the closing position, at an upstream end, the interior wall 207a extends the upstream wall 350 and in the opening position the interior wall 207a is far away from the upstream wall 350 so as to open the passage between the duct 202 and the window 210 and to allow the placing therein of the reverser flap 104 and the additional flap 404.

The movement in translation of the movable cowl 207 from the closing position to the opening position and vice versa is controlled, for example, by an actuator that is, in this case, a pair of linear actuators 362, each arranged on one of the sides of the movable cowl 207 and mounted in an articulated manner between the structure of the nacelle 102, 302, in this case the front frame 252, and the movable cowl 207, and more particularly, in this case, the interior wall 207a. Of course, the actuator may adopt another form, such as a motor or any other appropriate means for moving an element in translation.

The actuator 362 is controlled by a control unit of the processor type, which controls the displacement of the actuator in one direction or the other according to the requirements of the aircraft 10.

For each reverser flap 104, the drive mechanism 300 comprises
two bearings 360 (only one is shown in the figures), each being mounted fixedly on the structure of the nacelle 102, 402, in this case at each lateral end of the reverser flap 104, the axis of each bearing 360 being, in this case, perpendicular to the longitudinal axis x,
for each bearing 360, a lever arm 364, of which a first end is mounted movable in rotation on the bearing 360 and of which a second end is mounted fixedly on the reverser flap 104,
for each lever arm 364, a rail 366 integral with the movable cowl 207 and more particularly, in this case, on the sides of the interior wall 207a, each rail 366 comprising a straight portion 368, of which the axis is parallel to the direction of translation of the movable cowl 207, and a curved portion 370 that extends the straight portion 368 towards the front,
for each lever arm 364, a rod 372, of which a first end is mounted in an articulated manner on the lever arm 364, and
for each rail 366, a slider 373 that is mounted so as to be movable in translation on the rail 366 and is mounted so as to be articulated to a second end of the rod 372.

In the closing/closed/retracted position, the slider 373 is at that end of the straight portion 368 opposite the curved portion 370.

Operation is then as follows, starting from the closing/closed/retracted position:
the actuator 362 moves (arrow 52) the movable cowl 207 with the rail 366 towards the opening position,
as long as the slider 373 moves along the straight portion 368, the reverser flap 104 remains immovable,
when the slider 373 reaches the end of the straight portion 368, it engages in the curved portion 370, initiating the movement (in this case lowering) of the second end of the rod 372 and thus the rotation (arrow 54) of the lever arm 364 which, via the intermediary of its second end, causes tilting of the reverser flap 104.

The movable cowl 207 is moved throughout the above process until it reaches the opening position.

Conversely, operation is as follows, starting from the opening/open/active position:
the actuator 362 moves (arrow 56) the movable cowl 207 towards the closing position,
the slider 373 moves along the curved portion 370, which initiates the movement (in this case raising) of the second end of the rod 372 and thus the rotation (arrow 58) of the lever arm 364 which, via the intermediary of its second end, causes tilting of the reverser flap 104,
when the slider 373 reaches the end of the curved portion 370, it engages in the straight portion 368 and tilting of the reverser flap 104 ceases while the movable cowl 207 continues to move with the slider 373 moving along the straight portion 368.

The movable cowl 207 is moved throughout the above process until it reaches the closing position.

The rail 366 may adopt various forms such as a fitting attached to the movable cowl 207 or a groove.

In the embodiment of the invention shown in FIGS. 3 and 4, the first end of the lever arm 364 has a tab to which the rod 372 is attached.

In this case, the curved portion 370 is globally in the form of an arc of a circle that is open towards the front of the nacelle 102, 402. In this case, the angle subtended by the circular arc is approximately 30°.

Additional means of the nacelle 402 make it possible to coordinate the movements of the additional flap 404 with those of the reverser flap 104, that is to say, they coordinate the movement of the additional flap 404 from the retracted position to the active position with the movement of the reverser flap 104 from the closed position to the open position and vice versa. The additional flap 404 is mounted on the structure of the nacelle 402 so as to be able to tilt, and the additional means are in the form of a mechanical connection, such as an additional rod, of which a first end is mounted in an articulated manner on the additional flap 404, and of which the second end is mounted in an articulated manner on the reverser flap 104.

The invention has been more particularly described in the case of a nacelle under a wing but can be applied to a nacelle located at the rear of the fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A nacelle for a turbofan, the nacelle comprising:
a fixed cowl having a front end and an aft end, and a movable cowl movable in translation in a translation direction between a closing position in which it is close to the fixed cowl and an opening position in which it is far aft of the fixed cowl, an actuator configured to move the movable cowl from the closing position to the opening position, and vice versa, a window delimited on an upstream side by the fixed cowl and on a downstream side by the movable cowl, the window being open between a duct for a bypass flow and the exterior of the nacelle, a reverser flap mounted movable in rotation about a rotation axis between a closed position in which it obstructs the window and an open position in which it does not obstruct the window, and a drive mechanism configured to coordinate the movement from the closed position to the open position of the reverser flap with the movement from the closing position to the opening position of the movable cowl and vice versa, the drive mechanism comprising:

two bearings, each being mounted fixedly on a structure of the nacelle, for each bearing, a lever arm, of which a first end is mounted movable in rotation on the bearing and of which a second end is mounted fixedly on the reverser flap, for each lever arm, a rail integral with the movable cowl, each rail comprising a straight portion, of which an axis of the straight portion is parallel to the direction of translation of the movable cowl, and a curved portion that extends the straight portion towards the upstream side, for each lever arm, a rod, of which a first end is mounted in an articulated manner on the lever arm, and for each rail, a slider that is mounted so as to be movable in translation on the rail and is mounted so as to be articulated to a second end of the rod.

2. The nacelle according to claim 1, further comprising an additional flap mounted movable in rotation between a retracted position in which the additional flap is not positioned in the duct and an active position in which the additional flap is positioned across the duct and extends the reverser flap in the open position in the duct, and wherein the nacelle comprises additional means that coordinate the movement of the additional flap from the retracted position to the active position with the movement of the reverser flap from the closed position to the open position and vice versa.

3. The nacelle according to claim 2, wherein the additional means are in the form of a mechanical connection.

4. The nacelle according to claim 3, wherein the mechanical connection comprises an additional rod, of which a first end is mounted in an articulated manner on the additional flap, and of which the second end is mounted in an articulated manner on the reverser flap.

5. A turbofan comprising an engine and a nacelle according to claim 1 surrounding the engine, and in which the duct for the bypass flow is delimited between the nacelle and the engine.

6. An aircraft comprising at least one turbofan according to claim 5.

\* \* \* \* \*